ANALOG TO DIGITAL CONVERSION SYSTEM HAVING IMPROVED ACCURACY

Filed Oct. 28, 1965

INVENTORS
Frank G. Willard, Francis T. Thompson
and Clyde A. Booker, Jr.
BY E. F. Possessky
ATTORNEY United States Patent Office 3,530,458
Patented Sept. 22, 1970

3,530,458

ANALOG TO DIGITAL CONVERSION SYSTEM HAVING IMPROVED ACCURACY

Frank G. Willard, Monroeville, Francis T. Thompson, Penn Hills Township, Verona County, and Clyde A. Booker, Jr., Churchill, Pittsburgh, Pa., assignors to Westinghouse Electric Corporation, Pittsburgh, Pa., a corporation of Pennsylvania Filed Oct. 28, 1965, Ser. No. 505,532
Int. Cl. H03k 13/20
U.S. Cl. 340—347 4 Claims

ABSTRACT OF THE DISCLOSURE

An analog to digital conversion system for a computer includes an integrator which integrates an input analog signal over an integrating period equal to the steady-state period of the supply power waveform to minimize noise error in the integrator digital output. A phase locked oscillator controls the length of the integrating period. Error due to gain or zero drift in the system or to a change in the length of the integrating period is substantially offset by a recalibration control including the computer which provides control over the gain and zero characteristics of the system.

The present invention relates to analog to digital conversion systems and more particularly to analog input systems for digital computers in which error effects of noise voltages are reduced by integration of the analog signals.

Generally, analog signals are obtained from a wide variety of devices to indicate the time variation of process or operational variables such as temperature or strain or the like. The analog signals can simply be data logged or used in a feedback system for controlling the process or operation. Signal accuracy is adversely affected by noise voltages which are produced principally by inductive coupling between the analog signal conductors or from proximate power lines and equipment, particularly when the analog conductors are relatively long as in many industrial or similar plants.

Low pass filters can be employed in each analog input conductor, but unjustified expense is incurred when a relatively large number of analog inputs are in use. If the analog inputs are coupled to a multiplexing unit for signal sampling at a predetermined rate, a filter can be connected to the multiplexer output but the multiplexer switching rate is then sharply limited by the filter response time.

A more advantageous approach to noise elimination is to forego the use of filters and to integrate each analog signal for one or more periods of the power frequency. In this manner, fundamental and harmonic A.C. noise voltages are averaged out at zero value and the integrated value of the D.C. analog signal provides an accurate average indication of the analog variable over the integrating period. The integrating method is particularly effective where the measured variable varies at a rate of less than about 4 or 5 cycles per second and where the integrating period is one period of the 60 cycle power frequency.

Integration is conventionally achieved by a voltage to frequency converter and a digital counter. The converter transforms the analog signal into a frequency proportional to the instantaneous voltage value, and the counter is gated to count the number of cycles over the integrating period. The counter digital output is coupled to a computer or other device in which use is made of the proportionally measured integrated value of the variable. The frequency converter input can be coupled to a multiplexer so that time successive integrations of various analog multiplexer inputs are made in a sampling sequence.

Although the expected analog to digital conversion error of the conventional integration conversion scheme is expectedly as low as 0.1%, the conversion error encountered in practice is characteristically as high as 0.5% or more. The relatively high error stems from drift in the gain and zero characteristics of the converter and from transient and steady-state variations in the phase and frequency of the power signal which is used directly to establish the integrating period. Any change in the converter gain or zero characteristic results in conversion error since the integrated analog value changes without any actual change in the analog input. Similarly, a transient or steady-state change in power phase or frequency results in a change in the integrating period and a corresponding change in the integrated analog value without any actual change in the analog input.

CROSS REFERENCE TO RELATED APPLICATION

Ser. No. 624,302, entitled Analog to Digital Converter Utilizing an Integrator Having a Variable Integration Period and a Variable Discharge Rate, filed by F. G. Willard on Mar. 20, 1967 and assigned to the present assignee.

SUMMARY OF THE INVENTION

In accordance with the broad principles of the present invention, an analog to digital conversion system or an analog input system for a digital computer comprises an integrator having one or more analog inputs coupled thereto. Means, preferably in the form of a phase locked oscillator, are provided for controlling the integrator output so that the analog signal integrating time period tracks steady-state changes in the phase or frequency of the ambient power waveform yet is substantially constant over the short term thereby substantially eliminating conversion error due to transient power phase or frequency variations. Preferably, means are also coupled to the integrator for periodically recalibrating the integrator gain characteristic and, in predetermined cases, the integrator zero characteristic so as to eliminate conversion error due to steady-state power phase or frequency variations or drift in the integrator gain and zero characteristics. The analog signals and the gain and zero reference signals can be coupled to the integrator through a multiplexer, and a digital computer can be coupled to the integrator output and employed for recalibration control.

It is therefore an object of the invention to provide a novel analog to digital conversion system having improved accuracy.

Another object of the invention is to provide a novel analog to digital conversion system having a plurality of analog inputs and having a high analog sampling rate with economic filter-free noise elimination.

An additional object of the invention is to provide a novel analog to digital conversion system having an integrator for noise elimination wherein conversion error due to transient variation in power line frequency or phase is substantially eliminated.

A further object of the invention is to provide a novel analog to digital conversion system having an integrator for noise elimination in which conversion error due to steady-state variation in power line frequency or phase is substantially eliminated.

It is an additional object of the invention to provide a novel analog to digital conversion system having an integrator for noise elimination in which variations in integrator gain and/or zero characteristics are substantially eliminated to provide improved operating accuracy.

It is an additional object of the invention to provide a novel analog input system for a digital computer which operates with improved accuracy and a high analog sampling rate and which is characterized with improved economy.

These and other objects of the invention will become more apparent upon the consideration of the following detailed description along with the attached drawings.

DESCRIPTION OF THE PREFERRED EMBODIMENT

Figure 1:
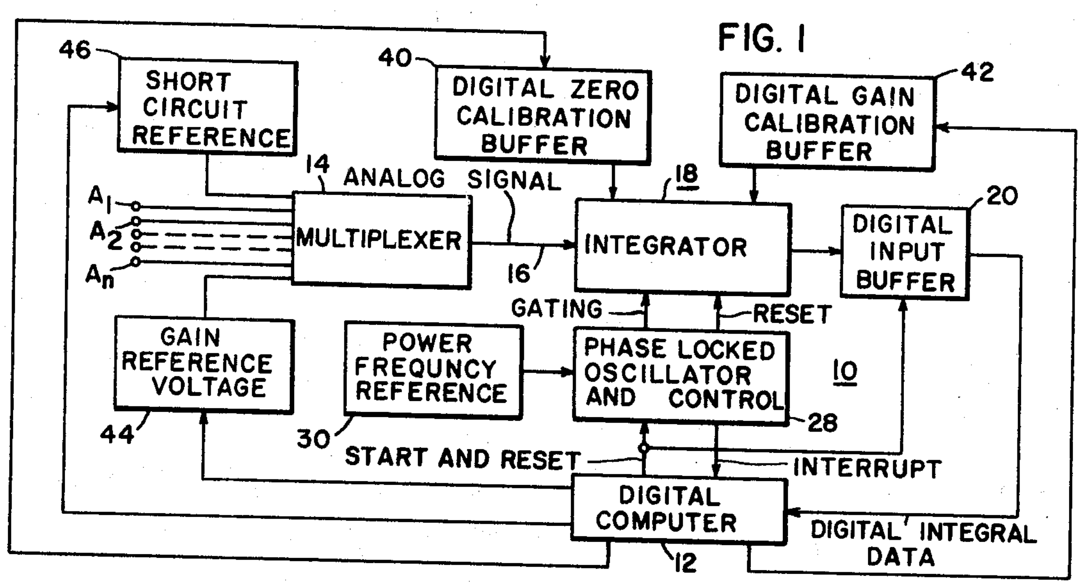
FIG. 1 shows a schematic diagram of an analog to digital conversion system arranged in accordance with the principles of the invention.

More specifically, there is shown in FIG. 1 an analog to digital conversion system 10 arranged in accordance with the principles of the invention. The conversion system 10 is especially adapted to operate as an analog input system for a digital process or data logging or other computer 12 since a large number of input analog signals $A_1$ to $A_n$ can be accommodated economically and efficiently. The signals $A_1$ to $A_n$ correspond to various predetermined operating variables of the system or plant with which the conversion system 10 is associated.

Each analog signal is normally a direct voltage, and best conversion results are realized for an analog signal variation rate of about 5 cycles per second or less when the standard nominal power frequency of 60 cycles per second provides the integration timing reference. All of the analog signals $A_1$ through $A_n$ are connected through respective conductors (common or ground not shown) to a conventional multiplexing unit 14 which samples the analog inputs by suitable switching action. The analog inputs are thus coupled to a multiplexer output 16 in a predetermined time sequence pattern for application to an integrator 18. The sampling rate and sampling pattern of the multiplexer 14 can be directly controlled by suitable circuitry in the multiplexer 14, and if desired the computer 12 can provide master multiplexing control (not indicated).

Analog to digital conversion is produced by the integrator 18 and the digital data is stored in a conventional digital input buffer 20 or other suitable interfacing device. As previously indicated, the integration operation is conducted to eliminate noise voltages caused by inductive or capacitive coupling between the analog input conductors and proximate power conductors. To average out the alternating noise voltages, the integrating time period is preferably equal to that of one power period, nominally one sixtieth of a second, but can be equal to that of a multiple number of power periods.

When an analog signal such as $A_1$ is coupled to the integrator 18, integration is performed only during the predetermined integrating time period by gating control. The analog sampling time is sufficiently long to encompass the predetermined integrating time. As one alternate scheme, integration can be performed during the entire sample time period during which the analog signal is coupled to the integrator 18, and the integral can be detected at two time points spaced in correspondence with the preselected measure of integrating time. The integral difference then equals the net integral value applicable to the preselected nominal integrating time.

Figure 5:
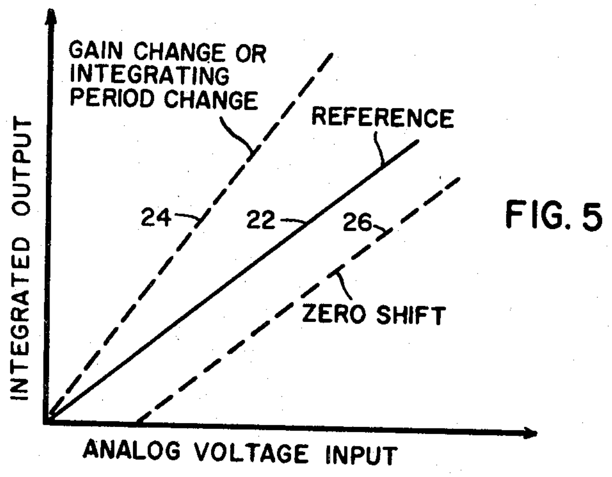
FIG. 5 shows a graph demonstrating the conversion error effects of changes in the integrator gain or the integrating period and a shift of the integrator zero characteristic.

The integrator 18 can include any suitable commercially available operational or integrating amplifier (not shown) which has a preset gain indicated by the slope of reference characteristic 22 in FIG. 5. The preset integrator zero characteristic corresponds to the intersect of the characteristic 22 at the origin. If the integrator 18 does include an integrating amplifier, an analog to digital voltage converter (not shown) is coupled between the integrating amplifier and the buffer 20.

Drift in gain results in slope change as indicated by dotted characteristic 24 and drift in the zero characteristic results in a shift in the intersect as indicated by dotted characteristic 26. Conversion error results from any drift in the gain or zero characteristic as previously described.

At the integrator output, the integral signal is in digital form and is applied to the input buffer 20 which has suitable logic circuitry for temporary data storage. The computer 12 is suitably designed and programmed to use the converted analog or digital integral data in the buffer 20 for process control or data logging or other suitable purposes.

Since the power period can change as a result of changing power phase or frequency, a phase locked oscillator 28 controls the integrating time period to minimize noise conversion error otherwise caused by the power waveform changes. By integrating time period, it is meant to refer to the time period over which integration is performed or the time period over which the integral is measured. The phase locked oscillator 28 can be any circuit adapted to produce a control signal for gating an input switching or gating circuit or the like in the integrator 18 with timing characteristics determined by relation to the steady-state power waveform. To maximize noise elimination, the time span of the gating signal and the integrating time period are varied to track the period of the average or steady-state power cycle. To minimize overall conversion error due to rapid changes in the integrating time period, the time span of the integrator gating signal is substantially independent of power line phase and frequency transients caused by phase shifting of the zero crossings of the power waveform when power line switching or the like occurs. Such power transients can result in zero crossing phase shifts equal to twenty microseconds or more and therefore could otherwise lead to substantial conversion error as a result of transient changes in the integrating time period. Accordingly, the gating signal from the phase locked oscillator 28 tracks the steady-state power line phase and frequency and is unaffected by transient changes in the power line phase and frequency.

To provide for steady-state power phase and frequency tracking, a power reference signal is coupled to the oscillator input as indicated by the reference character 30 and the response characteristics of the circuitry included in the oscillator 28 are appropriately established with a predetermined line of division between transient and steady-state phase and frequency changes in the power reference signal. In tracking the steady-state power phase, the oscillator output waveform is held in fixed relation to the steady-state power phase, and the fixed phase relation need not be an in-phase relation. Since the rate at which the steady-state phase difference between the oscillator and power signals changes is equal to a steady-state frequency difference between the signals, steady-state phase lock ultimately produces steady-state frequency lock and accordingly is required for fine control of the frequency equating process. In the oscillator 28, a frequency control feedback loop can provide coarse steady-state frequency corrections and a phase control loop can provide fine steady-state frequency corrections. A phase locked oscillator especially adapted to provide the described integrator gating control with steady-state power phase and frequency lock is disclosed in a copending application entitled "Phase Locked Oscillator" filed by C. A. Booker and F. T. Thompson on Oct. 28, 1965, Ser. No. 505,533, assigned to the present assignee and now issued as U.S. Pat. 3,448,402.

At the end of each integrating time period, the oscillator 28 gates the integrator 18 open and sends an interrupt signal to the computer 12. When information has been inputted from the buffer 20 to the computer 12, the oscillator 28 is signaled by the computer 12 to reset the integrator 18 so that a new integration can be performed when the next analog sample is applied to the input of the integrator 18. Suitable circuitry is employed in the oscillator 28 for the purpose of generating the computer interrupt and the integrator reset signals.

As an illustration of the integrator gating operation, the oscillator output can be a square wave having a frequency of 120 cycles per second with variance up to about 5 cycles per second which is entirely adequate for steady-state power phase and frequency follow since most steady-state power line frequency variations are within the range of about 0.1%. The integrator 18 is gated for two cycles of the gating signal to provide a nominal integrating time period of one sixtieth of a second, and during the next gating signal cycle computer read in and multiplexer switching are first performed and the integrator 18 is then reset. A new integration is started with the next gating signal cycle.

When the integrating time period is kept in step with the steady-state power phase and frequency, the noise voltage integral is substantially averaged out to zero. To compensate for resultant steady state changes in the time span of the integrating period and thereby to eliminate conversion error otherwise incurred, gain recalibration of the integrator 18 is provided as subsequently described.

Noise conversion error associated with integrator gating produced by a conventional fixed reference frequency oscillator is thus avoided substantially without incurring other error in its place. During power phase or frequency transients, the phase of the noise voltage may depart from the phase of the integrating time period so that noise voltages are not precisely averaged out to zero following integration, but the conversion error thus realized is an advantageous trade for the eliminated error due to transient variation of the integrating time period in conventional variable reference frequency analog to digital converters.

Figure 2:
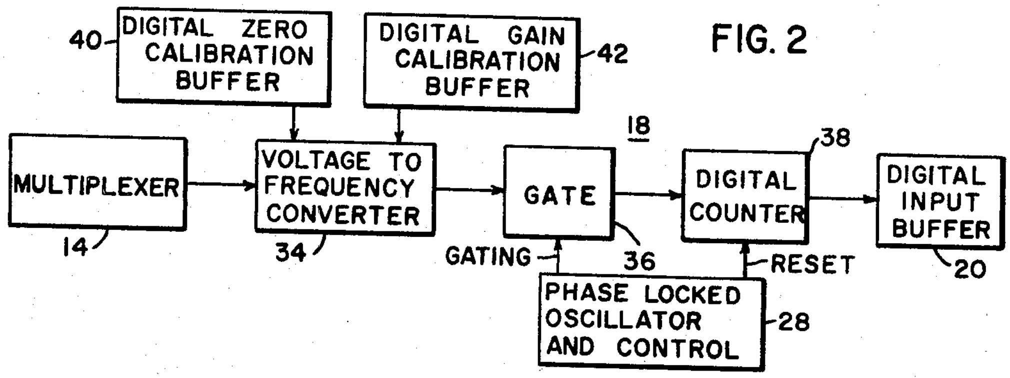
FIG. 2 shows a preferred arrangement of an integrator included in the system of FIG. 1.

In FIG. 2, a preferred arrangement for the integrator 18 is shown in greater block diagram detail. Thus, the integrator 18 includes a conventional voltage to frequency converter 34 which can include a conventional operational amplifier as a preamplifier (not shown). The output freqency of the converter 34 is proportional to the magnitude of voltage applied to the converter input from the multiplexer 14.

The converter output is applied to a conventional gating circuit 36 which is controlled by the gating signal from the phase locked oscillator 28. In turn, the gate output is applied to a conventional digital counter 38. At the start of each integrating period, the oscillator 28 operates the gate 36 so as to couple the frequency converter output to the digital counter 38. During the integrating time period, the digital counter 38 counts the converter oscillations and the count is equivalent to the analog voltage integral. At the end of the integrating period, the gate 36 is opened to isolate the converter output from the counter 38 and the count is transferred to the input buffer 20 and then to the computer 12. Counter reset follows computer read in as previously indicated and the integrator 18 is thus cleared for integration of the next analog sample voltage.

When the steady-state power phase or frequency changes, the integrating period changes correspondingly and the integral for an unchanged input analog signal also changes to produce operating error unless compensation is provided. The change in the integral which accompanies a change in the integrating period is equivalent to the integral change which accompanies a drift in integrator gain. Thus, as indicated in FIG. 5, the characteristic curve 24 is also representative of the result of a steady-state change in the integrating period.

To recalibrate the integrator 18 or the voltage to frequency converter 34 so as to offset error effects which otherwise exist, the system 10 includes both a digital zero calibration buffer 40 and a digital gain calibration buffer 42 which are coupled between the digital computer 12 and the integrator 18 or the voltage to frequency converter 34. However, in many applications, error due to zero characteristic drift is small enough to be tolerated, and the system 10 can function stably and relatively accurately with only the gain recalibration provided through the gain recalibration buffer 42.

A reference voltage for gain testing is applied to the input of the multiplexer 14 under computer control as indicated by the reference character 44. A short circuit reference input is also provided for the multiplexer 14 as indicated by the reference character 46, and it is operated under computer control to provide zero characteristic testing when such testing is needed or desired.

The computer 12 is suitably programmed to initiate gain and short circuit tests or gain tests only on a periodic basis compatibly with the sampling operation of the input analog signals $A_1$ through $A_n$. When the short circuit test is initiated, integration is performed and the computer 12 detects any departure of the resultant integral from zero value to effect zero characteristic recalibration through the zero calibration buffer 40. Similarly, when the gain test is initiated, integration is performed and the computer 12 detects any departure in the slope of the gain characteristic from the predetermined reference slope and recalibration is initiated through the gain calibration buffer 42. Any gain characteristic slope change from the reference can be due to internal integrator parameter changes or to oscillator tracking changes in the integrating period.

Figure 3:
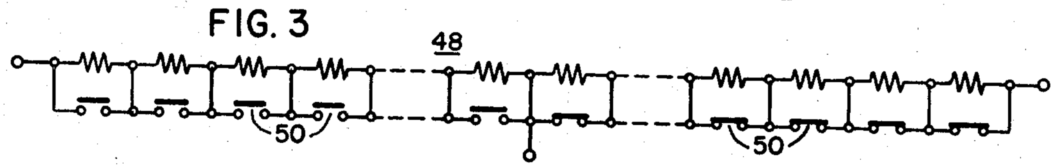
FIGS. 3 and 4 show respective illustrative circuits which can be used in effecting recalibration of the integrator gain and zero characteristics.
Figure 4:
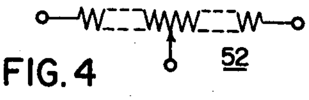

As previously indicated, an operational amplifier can be employed as part of the itnegrator 18, and a preamplifier can be included in the input circuitry of the voltage to frequency converter 34. In either case, the amplification circuitry is not per se part of the present invention and it is therefore not described in detail here. However, it is noted that the amplifier or preamplifier circuitry usually includes a feedback resistor which can be varied for gain adjustment as is well known in the art. Further, a bias resistor associated with an input error detecting stage or other input stage of the amplifier or preamplifier circuitry is usually provided for adjustment of the zero characteristic. Accordingly, as illustratively shown in FIG. 3, the feedback resistor or the bias resistor can be a resistor network 48 having a net resistance controlled by logic contacts 50 which respectively bypass successive series connected resistors in the network 48. The contacts 50 in turn are controlled by relays in the buffer 40 or 42. In the alternative, as shown in FIG. 4, the feedback resistor or the bias resistor in the amplifier of the integrator 18 or the preamplifier of the voltage to frequency converter 34 can be a motor operated rheostat 52 with motor energization controlled by the output from the buffer 40 or 42. In either event, the buffers 40 and 42, have suitable logic circuitry designed to provide resistance control which produces the periodic recalibration directed by the computer 12.

With gain recalibration, error due to steady-state changes in the integrating period is substantially eliminated and the integrating period can therefore be kept in step with the steady-state power phase and frequency in the manner previously described without error effects. Error due to gain drift in the integration circuitry is also substantially eliminated. With zero characteristic recalibration, error due to zero drift in the integration circuitry is substantially eliminated. In practice, the circuit 10 has operated with and without zero recalibration with conversion error as low as .05% or less.

Although the invention has been described as being particularly adaptable for digital computer input applications because of the economy and efficiency of conversion operation, it can be employed in other applications where the benefits from use are not as great in degree. For example, the invention can be used where only a few analog variables are being measured and logged in a suitable digital recording device. In such applications or even in the general usage, computer recalibration control can be omitted and manual or other preset or automatic circuit control provided in its place.

The foregoing description has been presented only to illustrate the principles of the invention. Accordingly, it is desired that the invention not be limited by the embodiments described, but, rather, that it be accorded an interpretation consistent with the scope and spirit of its broad principles.

What is claimed is:

1. An analog to digital conversion system comprising means for converting and integrating an input analog voltage signal to an integrated digital output signal, means for tracking the steady-state period of a power reference and for controlling the length of the integrating time period of said converting and integrating means so as to make the integrating time period of said converting and integrating means a whole number multiple of the period of the steady-state power reference, and means for registering the integrated digital signal from said converting and integrating means.

2. A conversion system as set forth in claim 1 wherein said converting and integrating means has gain characteristic controlling means and wherein there is additionally provided means for operating at least said gain controlling means to recalibrate the gain characteristic of said converting and integrating means in conformity with a predetermined gain reference.

3. A conversion system as set forth in claim 2 wherein said integrating period controlling means includes an oscillator which is phase and frequency locked to the steady-state reference power phase and frequency to establish the length of the integrating period of said converting and integrating means.

4. A conversion system as set forth in claim 3 wherein said converting and integrating means includes a voltage to frequency converter and a digital counter, a gate circuit coupling said frequency converter and said counter, and said oscillator is coupled to said gate circuit.

References Cited

UNITED STATES PATENTS

| | | | |
|---|---|---|---|
| 2,852,746 | 9/1958 | Scheele | 331—177 X |
| 2,897,486 | 7/1959 | Alexander et al. | 340—347 |
| 3,178,658 | 4/1965 | Henrion | 331—177 X |
| 3,127,601 | 3/1964 | Kaenel | 340—347 |
| 3,201,781 | 8/1965 | Holland | 340—347 |
| 3,351,932 | 11/1967 | Hibbits et al. | 340—347 |
| 3,354,453 | 11/1967 | Hibbits et al. | 340—347 |
| 3,368,149 | 2/1968 | Wasserman | 324—99 |

MAYNARD R. WILBUR, Primary Examiner

G. R. EDWARDS, Assistant Examiner

U.S. Cl. X.R.

235—150.51